(12) United States Patent
Scholz et al.

(10) Patent No.: US 8,631,017 B2
(45) Date of Patent: Jan. 14, 2014

(54) COLLABORATIVE FILTERING WITH HASHING

(75) Inventors: Martin B. Scholz, San Francisco, CA (US); Shyamsundar Rajaram, San Francisco, CA (US); Rajan Lukose, Oakland, CA (US)

(73) Assignee: Hewlett-Packard Development, L.P., Houston, TX (US)

(*) Notice: Subject to any disclaimer, the term of this patent is extended or adjusted under 35 U.S.C. 154(b) by 435 days.

(21) Appl. No.: 12/970,262

(22) Filed: Dec. 16, 2010

(65) Prior Publication Data

US 2012/0158741 A1 Jun. 21, 2012

(51) Int. Cl.
*G06F 7/00* (2006.01)
*G06F 17/30* (2006.01)

(52) U.S. Cl.
USPC .......................................... 707/748; 707/747

(58) Field of Classification Search
USPC .................................................. 707/748, 747
See application file for complete search history.

(56) References Cited

U.S. PATENT DOCUMENTS

| | | | |
|---|---|---|---|
| 7,472,153 B1* | 12/2008 | Keenan | 708/446 |
| 7,475,027 B2 | 1/2009 | Brand | |
| 7,624,095 B2 | 11/2009 | Majumder | |
| 2009/0099984 A1 | 4/2009 | Zhu et al. | |
| 2009/0299996 A1 | 12/2009 | Yu et al. | |
| 2010/0030764 A1* | 2/2010 | Koren | 707/5 |
| 2010/0138443 A1* | 6/2010 | Ramakrishnan et al. | 707/769 |
| 2010/0169338 A1* | 7/2010 | Kenedy et al. | 707/758 |
| 2010/0250556 A1* | 9/2010 | Park et al. | 707/749 |
| 2011/0231405 A1* | 9/2011 | Herbrich et al. | 707/748 |
| 2011/0302155 A1* | 12/2011 | Yan et al. | 707/723 |
| 2012/0131034 A1* | 5/2012 | Kenedy et al. | 707/767 |
| 2012/0191714 A1* | 7/2012 | Datar et al. | 707/737 |

OTHER PUBLICATIONS

Stephen J. Redman, "Stochastic Sampling of a Binary Random Process—II", 1964, Monash University, pp. 39-43.*

Bingham, et al., Random Projection in Dimensionality Reduction: Applications to Image and Text Data, Laboratory of Computer and Information Science, Helsinki University of Technology, 2001, pp. 245-250, http://delivery.acm.org/10.1145/510000/502546/p245-bingham.pdf?key1=502546&key2=9018749821&coll=DL&dl=ACM&CFID=110234091&CFTOKEN=44184531.

(Continued)

*Primary Examiner* — Apu Mofiz
*Assistant Examiner* — Jared Bibbee (57) ABSTRACT

Systems, methods, and machine readable and executable instructions are provided for collaborative filtering. Collaborative filtering includes representing users and objects by rows and columns in an ordinal ratings matrix having a particular dimensional space. Values in the ordinal ratings matrix are weighted with a weight matrix having the particular dimensional space. The weight matrix is hashed into a lower dimensional space by one of row and column by multiplying a projection matrix by the weight matrix. The ordinal ratings matrix is hashed into a lower dimensional space by multiplying the projection matrix by an element-wise product of the weight matrix and the ordinal ratings matrix to form a reduced ratings matrix, and element-wise dividing the reduced ratings matrix by the hashed weight matrix. The hashed ordinal ratings matrix and the hashed weight matrix are low-rank approximated by alternating least squares. A result of the low-rank approximation for the one of row and column is updated using the ordinal ratings matrix and the weight matrix. A recommendation of one of the objects can be generated for one of the users based on the updated result.

15 Claims, 4 Drawing Sheets

(56) References Cited

OTHER PUBLICATIONS

Takacs, et al., Scalable Collaborative Filtering Approaches for Large Recommender Systems, Journal of Machine Learning Research 10, Mar. 2009, pp. 623-656, http://jmlr.csail.mit.edu/papers/volume10/takacs09a/takacs09a.pdf.

Zhou, et al., Large-scale Parallel Collaborative Filtering for the Netflix Prize, 12 pgs., http://www.hpl.hp.com/personal/Robert_Schreiber/papers/2008%20AAIM%20Netflix/netflix_aaim08(submitted).pdf.

Papadimitriou, et al, Latent Semantic Indexing: A Probabilistic Analysis, Computer Science Division, U. C. Berkeley, Nov. 14, 1997, 21 pgs.

Weinberger, et al., Feature Hashing for Large Scale Multitask Learning, ICML '09: Proceedings of the 26th Annual International Conference on Machine Learning, 2009, pp. 1113-1120, New York, NY USA.

* cited by examiner

COLLABORATIVE FILTERING WITH HASHING

BACKGROUND

In a collaborative filtering setting, an ordinal ratings matrix can represent some form of "rating" by users over objects. For example, data contained in the ordinal ratings matrix could represent a rating that a user has given an object (e.g., a movie) on an ordinal ratings scale (e.g. a numerical range from 1 to 5) based on the user's opinion of the object. The matrix is said to be ordinal because the data is chosen from a selection of more than two values (e.g., a rating from "like" to "dislike," which can be represented, for example, by a ratings scale from 1 to 5). Missing values are often present in these ordinal ratings matrices because users have not rated every object. Matrix completion methods using matrix factorization can be used to predict unknown values of the ratings matrix. The dimensionality of such data sets, however, can be large and difficult to manage when performing matrix completion. Therefore, it is helpful to reduce the dimensionality of the data sets and make them more manageable by using a projection matrix. Challenges arise in handling the missing values when undergoing dimensionality reducing projections, performing the matrix factorization, and making predictions of ratings in the original unprojected space.

DETAILED DESCRIPTION

Systems, methods, and machine readable and executable instructions are provided for collaborative filtering. Collaborative filtering can include representing users and objects by rows and columns in an ordinal ratings matrix having a particular dimensional space. As used herein, "ordinal" refers to values that are chosen from a selection of more than two values. A weight matrix having the particular dimensional space can be hashed into the lower dimensional space by multiplying a projection matrix by the weight matrix. The ordinal ratings matrix can be hashed into a lower dimensional space by multiplying the projection matrix by an element-wise product of the weight matrix and the ordinal ratings matrix to form a reduced ratings matrix, and element-wise dividing the reduced ratings matrix by the hashed weight matrix. The hashed weighted ordinal ratings matrix can be low-rank approximated (e.g., by alternating least squares). A result of the low-rank approximation for the one of row and column can be updated using the ordinal ratings matrix and the weight matrix. A recommendation of one of the objects can be generated for one of the users based on the low-rank approximated hashed weighted ordinal ratings matrix.

A novel hashing technique that takes into account missing values in ordinal ratings matrices, employing convex combinations of a subset of users can significantly reduce the size of the ordinal ratings matrix and provide an approximation of the same without sacrificing meaningful accuracy. Simulations of an example of a method according to the present disclosure have resulted in a projected matrix that is three orders of magnitude smaller than the matrix in the original unprojected space A recommendation can be generated of an existing object for an existing user, both of which were previously included in the ordinal ratings matrix, based on the low-rank approximated hashed matrix. For example, an online movie rental service could generate a new recommendation of an existing movie for an existing user.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. For example, 120 may reference element "20" in FIG. 1, and a similar element may be referenced as 420 in FIG. 4. In addition, the proportion and the relative scale of the elements provided in the figures are intended to illustrate the examples of the present disclosure, and should not be taken in a limiting sense.

Figure 1:
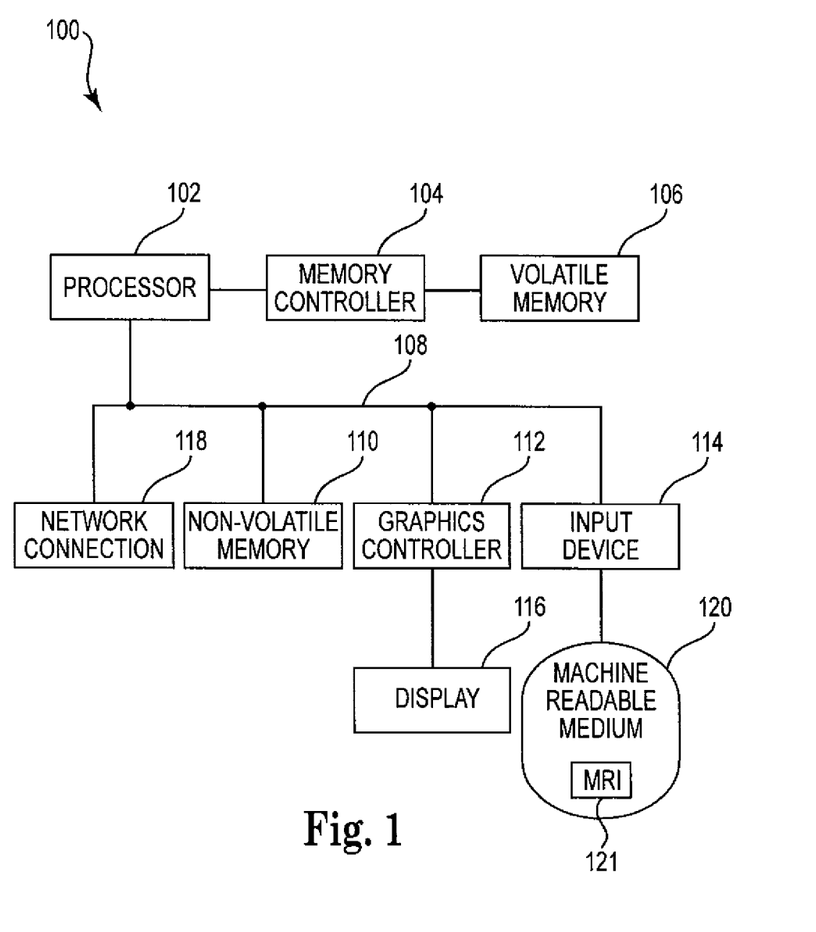
FIG. 1 illustrates a block diagram of an example of a system for collaborative filtering according to the present disclosure.

FIG. 1 illustrates a block diagram of an example of a system 100 for collaborative filtering according to the present disclosure. The system 100 can include processor resources 102 and memory resources (e.g., volatile memory 106 and/or non-volatile memory 110) for executing instructions stored in a tangible non-transitory medium (e.g., volatile memory 106, non-volatile memory 110, and/or machine readable medium 120) and/or an application specific integrated circuit (ASIC) including logic configured to perform various examples of the present disclosure. A machine (e.g., a computing device) can include and/or receive a tangible non-transitory machine readable medium 120 storing a set of machine readable instructions (MRI) (e.g., software) 121 via an input device 114. As used herein, processor resources 102 can include one or a plurality of processors such as in a parallel processing system. Memory resources can include memory addressable by the processor resources 102 for execution of machine readable instructions. The machine readable medium 120 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 110 can be a database including a plurality of physical non-volatile memory devices. In various examples, the database can be local to a particular system or remote (e.g., including a plurality of non-volatile memory devices 110).

The processor resources 102 can control the overall operation of the system 100. The processor resources 102 can be connected to a memory controller 104, which can read and/or write data from and/or to volatile memory 106 (e.g., RAM). The memory controller 104 can include an ASIC and/or a processor with its own memory resources (e.g., volatile and/or non-volatile memory). The volatile memory 106 can include one or a plurality of memory modules (e.g., chips). A basic input-output system (BIOS) for the system 100 may be stored in non-volatile memory 110 or other non-volatile memory not specifically illustrated, but associated with the processor resources 102. The BIOS can control a start-up or boot process and control basic operation of the system 100.

The processor resources 102 can be connected to a bus 108 to provide for communication between the processor resources 102 and other portions of the system 100. For example, the bus 108 may operate under a standard protocol such as a variation of the Peripheral Component Interconnect (PCI) bus standard, or the like. The bus 108 can connect the processor resources 102 to the non-volatile memory 110, graphics controller 112, input device 114, and/or the network connection 118, among other portions of the system 100. The non-volatile memory 110 (e.g., hard disk, SSD, etc.) can provide persistent data storage for the system 100. The graphics controller 112 can connect to a display device 116, which can provide an image to a user based on activities performed by the system 100.

The system 100 can generate a recommendation based on a sparse pattern of data. The recommendation can reflect a likelihood that a particular user will prefer a particular object for which no user preference data relative to the particular user is available. The prediction may be based on data obtained from users other than the particular user for the particular object and/or on data obtained from the particular user for objects other than the particular object. In some examples, the display device 116 can display a visual representation of the recommendation. In some examples, the recommendation can be provided to the particular user via the network connection 118 (e.g., when the user is remote to the system 100).

Performing collaborative filtering for matrices as large as possible that contain missing values may be desired, but may be limited due to the size of the matrices and the processing capabilities of a given system (e.g., a computing system). Therefore, it is helpful to reduce the dimensionality of the data sets and make them more manageable by using a projection matrix. Challenges arise in handling the missing values when undergoing dimensionality reducing projections, performing the matrix factorization, and making predictions of ratings in the original unprojected space. Examples of the present disclosure can significantly reduce the processing time required to generate recommendations based on an ordinal ratings matrix by hashing the matrix into a lower dimensional space that takes account of missing values in the ordinal ratings matrix before performing an approximation of the matrix in a manner that permits calculations of solutions in the hashed space that are valid in the unhashed space after various computations. Thus, various examples of the present disclosure can enable a given system to perform collaborative filtering for larger matrices that contain missing values than would otherwise be practicable.

With respect to notation, upper case letters are used herein to denote matrices (e.g., R can denote an ordinal ratings matrix R). A letter with a single index denotes a row vector of a matrix having the same letter, with the index specifying the row of the matrix. For example, $U_i$ denotes a row vector for column i of the matrix U. Components of matrices are denoted using two indices. For example, $U_{ij}$ denotes the element in row i and column j of matrix U. A column vector is denoted by a letter with a single index following a period and comma. For example, $U_{\cdot j}$ denotes a column vector for column j of the matrix U. For a matrix U, $\|U\|_F^2$ denotes the Frobenius norm. The vector 1 denotes the column vector that has 1 as the value of each component. Its dimensionality can be concluded from the context. Finally, I refers to the identity matrix.

An ordinal ratings matrix R can be generated and/or received and can include n rows (e.g., representing users) and m columns (e.g., representing objects). Such objects can include, for example, movies, books, URLs, or other objects for which users can express a preference (e.g., from like to dislike). Preferences may be expressed explicitly, for example, by having a user provide a rating (e.g., a value from 1 to 5, although examples are not so limited to this range) for a particular object. Thus, R may include ordinal values (e.g., values from 1 to 5). Unobserved values do not necessarily yield a value of 0. Known values are rare, however, so a value within a set of possible ratings (e.g., from 1 to 5) can be assigned for missing values and weights can be used to reflect confidence.

Referring generally to the ordinal ratings matrix R, it can have a particular dimensional space that is quite large. For example, a movie rental company, book seller, or the Internet may have a large number (e.g., millions) of movies, books, or web pages respectively for which users may express a preference. Accordingly, to reduce a burden on processing such an ordinal ratings matrix, a low-rank approximation of the ordinal ratings matrix can be sought.

A problem with collaborative filtering exists when recommending objects (e.g., movies) to an individual user based on ratings (e.g., star ratings where a user selects a number of stars based on their preference of the object) provided as well as those of a large community of other users. The ratings can be ratings on a fixed scale, for example between 1 and 5 stars. The vast majority of elements are usually unknown. In this formulation, the goal is to predict the unknown elements of the matrix as accurately as possible. A value within the set of possible ratings can be assigned for unknown values, as discussed herein, while known values can be represented by an ordinal value. Confidence can be represented in terms of a separate weight matrix W, which has the same dimensionality as R and assigns a weight to each index in R in the original space to reflect the confidence of individual ratings. The weight matrix W can be composed of non-negative values from 0 to 1, inclusive. A low value in the weight matrix W can represent a low confidence in the rating while a high value in the weight matrix can represent a high confidence in the rating. For example, indices in the weight matrix W can include a value from 0 to 1 corresponding to each of the indices in the ordinal ratings matrix R that have an unknown value. In another example, indices in the weight matrix W can include a value of 1 corresponding to each of the indices in the ordinal ratings matrix R that have a known value (e.g., a high weight can be assigned to a rating of 3 where the rating is derived from actual user feedback by expressing a preference for a particular object). In some examples, the value of a particular index in the weight matrix W can represent a decimal equivalent of a percentage confidence in the corresponding rating from the ordinal ratings matrix R (e.g., 1 can represent 100% confidence). The weight matrix W is subject to a positivity constraint such that the values in the weight matrix W are positive, where for purposes of the positivity constraint 0 is considered to be positive.

For a given matrix $R \in \Box^{n \times m}$, a singular value decomposition (SVD) is a decomposition of the matrix $R = XSY^T$, where $X \in \Box^{n \times r}$ and $Y \in \Box^{m \times r}$ are orthogonal matrices, r is the rank of R, and S is a diagonal matrix with the singular values of R on its main diagonal. When projecting X, S, and Y onto the d≤r columns for which S has the highest singular values, the product of the three resulting matrices gives the best approximation of $\tilde{R}$ of rank d with respect to $\|R-\tilde{R}\|_F^2$. The alternating least squares (ALS) algorithm allows incorporation of weights when using the SVD framework. Weights reflect the impact of approximation errors on the overall loss.

The following algorithm, in pseudo-code, provides a description of ALS:

---

Require: data matrix $R \in \square^{n \times m}$, rank d, weight matrix W with the same dimensionality as R
Ensure: Matrices $X \in \square^{n \times d}$ and $Y \in \square^{m \times d}$
    Initialize Y randomly
    repeat
        Update $X_r$, $\forall r \in \{1,...,n\}$
        Update $Y_c$, $\forall c \in \{1,...,m\}$
    until convergence.
return X and Y

---

The variations of ALS discussed herein have the skeleton depicted in the algorithm above, but differ in terms of the loss function and corresponding updates of X and Y. The algorithm starts with a random matrix Y, and then alternates steps of optimizing X for fixed Y and of optimizing Y for fixed X. Since both these steps are perfectly symmetric, for notational simplicity, only the case of optimizing X is discussed in detail.

ALS with regularization may improve results. Accordingly, the Tikhonov-regularization parameter $\lambda$ may be used. An adaptation of the standard ALS loss function allows incorporation of weights. If W is the weight matrix, then weighted loss with respect to W can be defined as:

$$L_W(X, Y) := \sum_{i,j} W_{i,j} \left( \begin{array}{c} (R_{i,j} - X_i Y_j^T)^2 + \\ \lambda(\|X_i\|_F^2 + \|Y_j\|_F^2) \end{array} \right)$$

The problem of updating X to minimize the loss $L_W$ still has a closed-form:

$$X_r := R_r \tilde{W}_r Y \left( Y^T \tilde{W}_r Y + \lambda \left( \sum_{i \in M} W_{r,i} \right) I \right)^{-1}, \quad (1)$$

where $\tilde{W}_r$ is an n×n diagonal matrix with the weights of row r on the main diagonal.

Any particular value in the weight matrix W corresponds to a specific value in the ordinal ratings matrix R. Weights are positive, including 0, and represent the confidence of the corresponding rating being correct. A weight of 0 represents an unknown value (the value $R_{i,j}$ has no effect in that case), whereas a high weight reflects a high confidence. Usually, a weight of 1 will be the default for "regularly" observed ratings. In the most simple case, W is a binary indicator matrix with a value of 0 for all missing values and a value of 1 for all known values. But there are different sources for more complex weighting schemes, ranging from domain experts over background knowledge to heuristic constructions.

Generating a low-rank approximation of the ordinal ratings matrix can itself be quite intensive on processing resources when the ordinal ratings matrix R is sufficiently large. Further, challenges exist when missing values are present in an ordinal ratings matrix because the method used for low-rank approximation must be compatible with matrix completion methods that are used to predict unknown values of the ratings matrix. Examples of the present disclosure provide for hashing the ordinal ratings matrix R in a novel way so as to account for missing values in the ordinal ratings matrix and to reduce the burden on processing resources for low-rank approximating the ordinal ratings matrix.

Some examples of the present disclosure can include the use of a projection matrix $\pi$ that is a matrix including p rows and n columns (p×n) where the number p is much smaller than the number n (p<<n). For example, p can be three orders of magnitude smaller than n, however examples are not so limited. Each row of the projection matrix $\pi$ ($\pi_i$) can be a row vector formed by stochastically sampling from the m-dimensional simplex of the ordinal ratings matrix R such that $sum_i$ $\pi_{ij}=1$ (e.g., a convex combination), where $\pi_{ij}$ is a coefficient (e.g., a numerical value) of the projection matrix P. Alternatively, each column of the projection matrix $\pi$ ($\pi_j$) can be a column vector formed by stochastically sampling from the m-dimensional simplex such that $sum_j$ $\pi_{ij}=1$. In either case, stochastically sampling can include combining one of objects and users into groups of objects or users. The projection matrix $\pi$ can include a convex combination normalization with a positivity constraint (e.g., each coefficient is non-negative and sums to one).

We go from the original space with a ratings matrix R (after assigning a value within the set of possible ratings for unknowns) and a weight matrix W to a projected space with a much smaller rating matrix R' and a weight matrix W'.

For a given projection matrix $\pi$, define:

$$W':=\pi W$$

$$R':=\pi(W.R)./W',$$

where "." denotes element-wise matrix multiplication and "./" denotes element-wise matrix division.

When the ALS procedure is run on this R', W' pair, the algorithm will accord the correct weight to each projection. The contribution to the overall ALS loss is zero when an element of W' is zero, so the element-wise division by W' does not pose any problem.

The projection matrix can be a sparse projection matrix formed of a convex combination of a subset of users. The sparse projection matrix can be selected by using a matrix sampling procedure. The matrix sampling procedure can be parameterized by selecting a parameter, which can reflect a size of the subset of users that have an effect on the users in a projected space. This can be done randomly or can be done by parameterizing a sparsity of the projection matrix. In accordance with the requirements for projections as discussed herein (e.g., column normalization and non-negativity), the following equation can be used in parameterizing the sparsity of the projection matrix. For each column vector, $U_{.,j}$, sample a vector, $U_i$, and define:

$$U_{i,c} := \frac{U_i^T}{\sum_k (U_k)^T}$$

As used herein, T refers to a temperature parameter. When T is 1, the column of U can be sampled from a uniform distribution (e.g., all users will have an effect on users in a projected space). As T approaches infinity, each user contributes to a single projection (e.g., a single user will have an effect on users in the projected space). Therefore, an increasing finite T leads to fewer users having an effect on each of the users in the projected space and the remaining users having a smaller, yet non-zero effect, Selecting a value for T, therefore can allow for parameterizing a sparsity of the projection matrix.

As discussed herein, the sparse projection matrix can be selected by using a matrix sampling procedure. The projection matrix sampling procedure can be parameterized by a temperature parameter. In one example, the value of the temperature parameter can be selected to adjust a number of users that have an effect on users in the projected space. Parameterizing the sparsity of the projection matrix can include, for example, adjusting the sparsity of the projection matrix by selecting a value for T. The sparsity of the projection matrix can be increased by increasing the T. The sparsity of the projection matrix can be decreased by decreasing the T.

Parameterizing the sparsity of the projection matrix can further include, for example, selecting a T that results in a size of the subset of users that have an effect on users in the projected space of from 4 to 5 users. In this example, the 4 to 5 users will have a greater effect on the users in the projected space, while the remaining users will have a smaller, yet non-zero effect. In a further example, parameterizing the sparsity of the projection matrix can include selecting a T that results in a size of the subset of users that have an effect on users in the projected space of from 1 to 10 users.

Employing such a projection matrix $\pi$ for hashing the ordinal ratings matrix R differs from common random projections in that random projections do not support missing values and as an effect do not require the positivity constraint as discussed herein (e.g., the positivity constraint on W' according to some examples of the present disclosure). Accordingly, as described herein with respect to the use of alternating least squares, examples of the present disclosure do not employ straight-forward singular value decomposition (SVD) because of the presence of missing values and the notion of a weight matrix.

Matrix factorization in the projected space corresponds to applying the previously described ALS algorithm on the projected rating matrix R' and projected weight matrix W'. Because of the reduced dimensionality of R' and W', the training is more efficient compared to training on R and W. The ALS algorithm can provide an initial solution X' and Y' (e.g., $X'Y'^T$) that approximates R'.

At deployment time, the model will operate in the original space. At any point during ALS training it is sufficient to store either X or Y because of the alternating nature of the algorithm. If X' is operating in the projected space, then Y' is still operating in the same space as Y. A result of the low-rank approximation for the row or column can be updated using the ordinal ratings matrix R and the weight matrix W. That is, by keeping Y' fixed, one can perform one final "half-iteration" using the original R and W to compute X*, such that $X*Y'^T$ is a valid approximation of R. Further, this last half-step can be performed for each user separately on demand because of the nature of ALS (using Equation (1)). Even if the original set of users at training time is huge there is no need to perform a "full" computation of X*.

Figure 2:
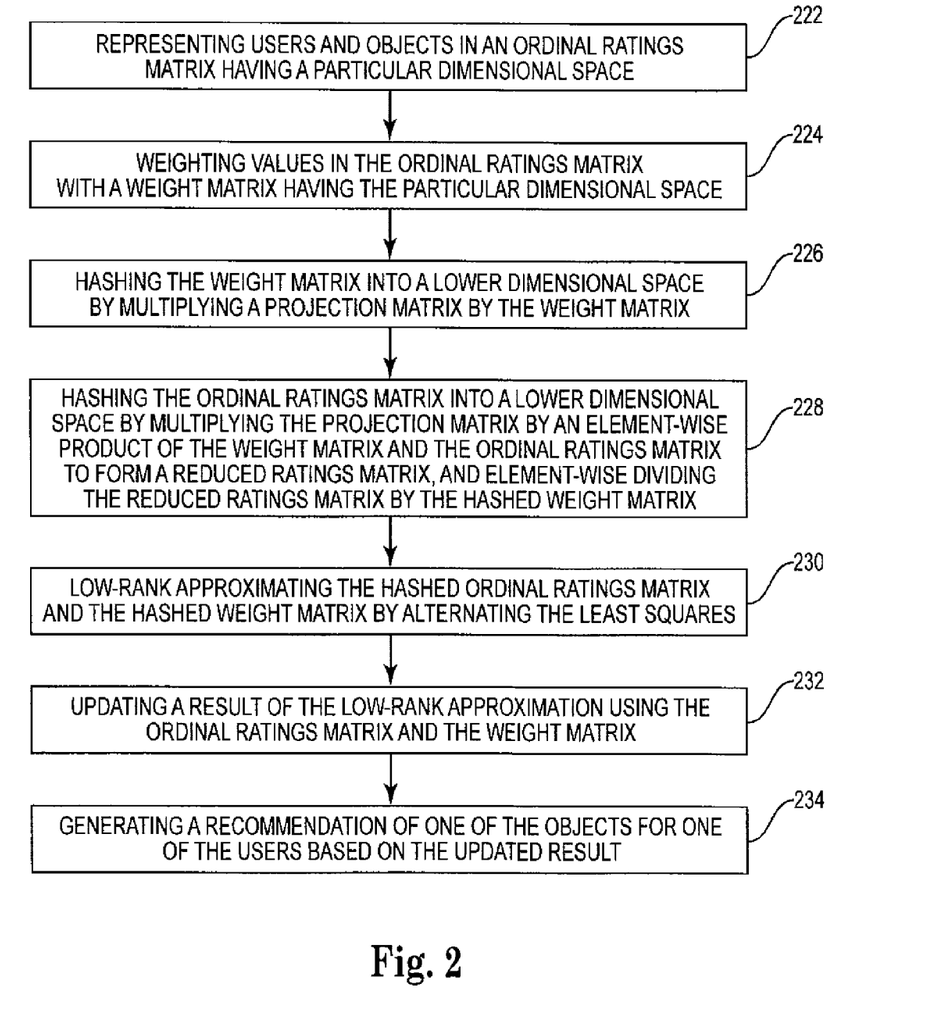
FIG. 2 provides a flow chart illustrating an example of a method for collaborative filtering according to the present disclosure.

FIG. 2 provides a flow chart illustrating an example of a method for collaborative filtering according to the present disclosure. The method includes representing 222 users and objects in an ordinal ratings matrix having a particular dimensional space. The method includes weighting 224 values in the ordinal ratings matrix with a weight matrix having the particular dimensional space. The method includes hashing 226 the weight matrix into a lower dimensional space by multiplying a projection matrix by the weight matrix. The method includes hashing 228 the ordinal ratings matrix into a lower dimensional space by multiplying the projection matrix by an element-wise product of the weight matrix and the ordinal ratings matrix to form a reduced ratings matrix, and element-wise dividing the reduced ratings matrix by the hashed weight matrix. The method includes low-rank approximating 230 the hashed ordinal ratings matrix and the hashed weight matrix (e.g., by alternating least squares). The method includes updating 232 a result of the low-rank approximation for the one of row and column using the ordinal ratings matrix and the weight matrix. The method also includes generating 234 a recommendation of one of the objects for one of the users based on the updated result.

Figure 3:
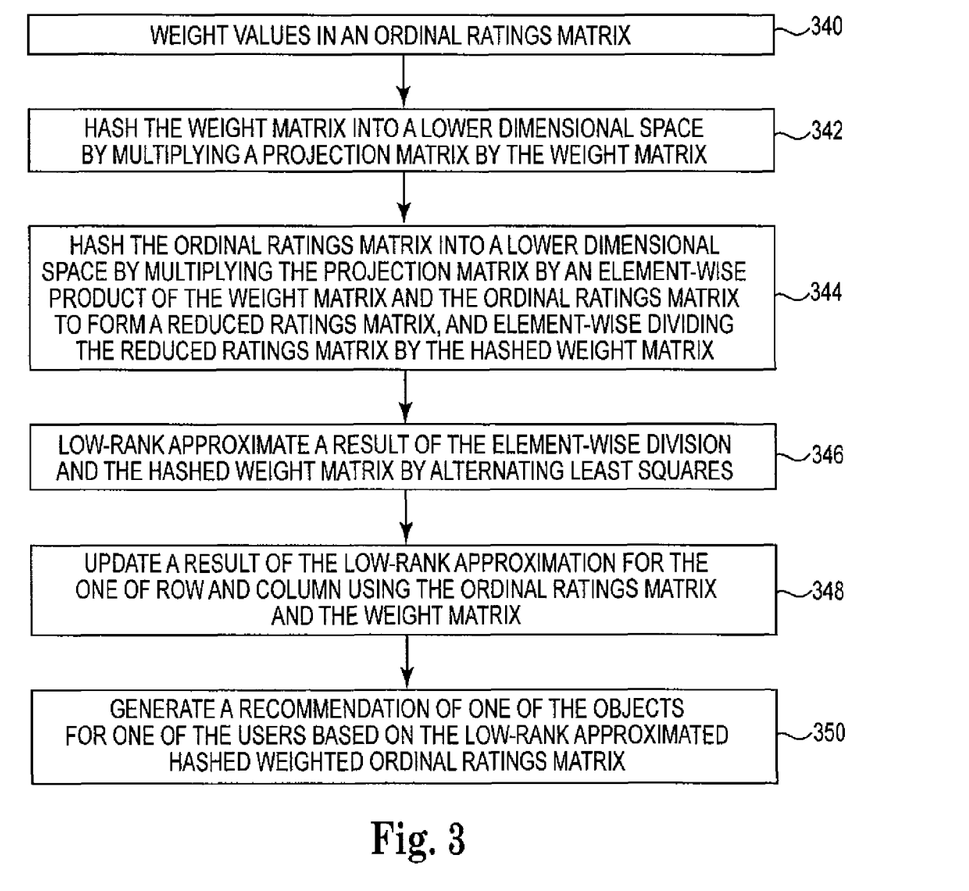
FIG. 3 illustrates a block diagram illustrating an example of machine readable non-transitory medium storing a set of instructions executable by the machine to cause the machine to perform collaborative filtering according to the present disclosure.

FIG. 3 provides a block diagram illustrating an example of machine readable non-transitory medium storing a set of instructions executable by the machine to cause the machine to perform collaborative filtering according to the present disclosure. The medium can store instructions 340 executable by the machine to cause the machine to weight values in an ordinal ratings matrix that represents users and objects by rows and columns and has a particular dimensional space with a weight matrix that has the particular dimensional space. The medium can also store instructions 342 executable by the machine to cause the machine to hash the weight matrix into a lower dimensional space by one of row and column by multiplying a projection matrix by the weight matrix. The medium can store instructions 344 executable by the machine to cause the machine to hash the ordinal ratings matrix into a lower dimensional space by multiplying the projection matrix by an element-wise product of the weight matrix and the ordinal ratings matrix to form a reduced ratings matrix, and element-wise dividing the reduced ratings matrix by the hashed weight matrix. The medium can also store instructions 346 executable by the machine to cause the machine to low-rank approximate a result of the element-wise division and the hashed weight matrix (e.g., by alternating least squares). The medium can store instructions 348 executable by the machine to cause the machine to update a result of the low-rank approximation for the one of row and column using the ordinal ratings matrix and the weight matrix. The medium can store instructions 350 executable by the machine to cause the machine to generate a recommendation of one of the objects for one of the users based on the low-rank approximated hashed weighted ordinal ratings matrix.

Machine readable and executable instructions and/or logic, which are operable to perform the method described in connection with FIGS. 2 and/or 3, can be present in whole or in part in the examples of other figures. Embodiments, however, are not limited to the particular examples given herein. Unless explicitly stated, the examples described herein are not constrained to a particular order or sequence. Additionally, some of the described examples, or elements thereof, can occur or be operated at the same, or at least substantially the same, point in time.

Figure 4:
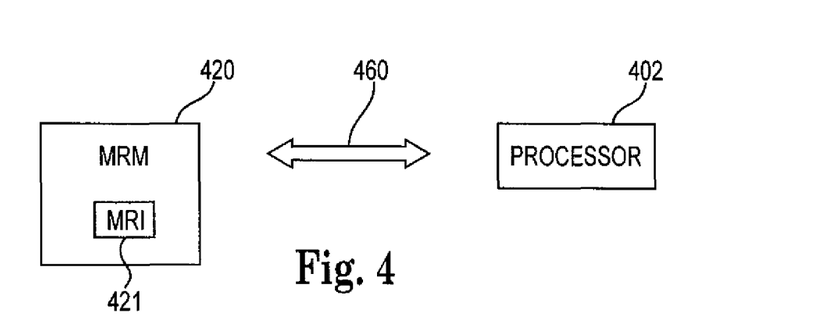
FIG. 4 illustrates a block diagram of an example of a machine readable medium in communication with processor resources according to the present disclosure.

FIG. 4 illustrates a block diagram of an example of a machine readable medium 420 in communication with processor 402 resources according to the present disclosure. A machine (e.g., a computing device) can include and/or receive a tangible non-transitory machine readable medium (MRM) 420 storing a set of machine readable instructions (MRI) (e.g., software) 421 for managing settings of a computing device, as described herein. As used herein, processor 402 resources can include one or a plurality of processors such as in a parallel processing system. The machine readable medium 420 can include volatile and/or non-volatile memory such as random access memory (RAM), magnetic memory such as a hard disk, floppy disk, and/or tape memory, a solid state drive (SSD), flash memory, phase change memory, etc.

The MRM 420 can be in communication with the processor 402 resources via a communication path 460. The communication path 460 can be local or remote to a machine associated with the processor 402 resources. Examples of a local communication path 460 can include an electronic bus internal to a machine such as a computer where the MRM 420 is one of volatile, non-volatile, fixed, and/or removable storage medium in communication with the processor 402 resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 460 can be such that the MRM 420 is remote from the processor 402 resources such as in the example of a network connection between the MRM 420 and the processor 402 resources (e.g., the communication path 460 can be a network connection). Examples of such a network connection can include a local area network (LAN), a wide area network (WAN), a personal area network (PAN), the Internet, among other examples of networks. In such examples, the MRM 420 may be associated with a first machine (e.g., a server) and the processor 402 resources may be associated with a second machine (e.g., a computing device). The first and second machines can be in communication via a networked communication path 460.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A computing device implemented method for collaborative filtering, comprising:
   representing users and objects in an ordinal ratings matrix having a particular dimensional space;
   weighting values in the ordinal ratings matrix with a weight matrix having the particular dimensional space;
   hashing the weight matrix into a lower dimensional space by multiplying a projection matrix by the weight matrix;
   hashing the ordinal ratings matrix into a lower dimensional space by multiplying the projection matrix by an element-wise product of the weight matrix and the ordinal ratings matrix to form a reduced ratings matrix, and element-wise dividing the reduced ratings matrix by the hashed weight matrix;
   low-rank approximating the hashed ordinal ratings matrix and the hashed weight matrix by alternating least squares;
   updating a result of the low-rank approximation using the ordinal ratings matrix and the weight matrix; and
   generating a recommendation of one of the objects for one of the users based on the updated result.

2. The method of claim 1, wherein the method includes weighting a known value in the ordinal ratings matrix with a value of 1.

3. The method of claim 2, wherein the method includes weighting a missing value in the ordinal ratings matrix with a value of 0.

4. The method of claim 1, wherein the method includes weighting values in the ordinal ratings matrix with a non-negative value.

5. The method of claim 1, wherein the projection matrix is a sparse projection matrix formed of a convex combination of a subset of users; and
   wherein the method includes selecting a size of the subset of users in the sparse projection matrix by parameterizing a sparsity of the projection matrix.

6. The method of claim 5, wherein parameterizing a sparsity of the projection matrix includes increasing the sparsity of the projection matrix by increasing a temperature parameter.

7. The method of claim 5, wherein parameterizing the sparsity of the projection matrix includes decreasing the sparsity of the projection matrix by decreasing a temperature parameter.

8. The method of claim 1, wherein:
   hashing includes convex combination hashing the ordinal ratings matrix and the weight matrix into the lower dimensional space by the one of row and column, wherein the one of row and column represents objects; and
   wherein hashing includes stochastically combining objects into groups of objects.

9. A machine readable non-transitory medium storing a set of instructions executable by the machine to cause the machine to:
   weight values in an ordinal ratings matrix that represents users and objects by rows and columns and has a particular dimensional space with a weight matrix that has the particular dimensional space;
   hash the weight matrix into a lower dimensional space by one of row and column by multiplying a projection matrix by the weight matrix;
   hash the ordinal ratings matrix into a lower dimensional space by multiplying the projection matrix by an element-wise product of the weight matrix and the ordinal ratings matrix to form a reduced ratings matrix, and element-wise dividing the reduced ratings matrix by the hashed weight matrix;
   low-rank approximate a result of the element-wise division and the hashed weight matrix by alternating least squares;
   update a result of the low-rank approximation for the one of row and column using the ordinal ratings matrix and the weight matrix; and
   generate a recommendation of one of the objects for one of the users based on the low-rank approximated hashed weighted ordinal ratings matrix.

10. The medium of claim 9, wherein the instructions cause the machine to hash the ordinal ratings matrix by convex combination hashing including stochastically sampling a dimensional simplex of the ordinal ratings matrix by the one of row and column such that a sum of stochastically sampled coefficients is one and each of the stochastically sampled coefficients is positive.

11. The medium of claim 9, wherein the ordinal ratings matrix includes a value chosen from a selection of more than two values.

12. A system for collaborative filtering, comprising:
    a processor;
    volatile memory coupled to the processor;
    non-volatile memory coupled to the processor, wherein the non-volatile memory stores an ordinal ratings matrix representing users and objects by rows and columns and having a particular dimensional space;
    a network connection coupled to the processor;
    wherein the system receives a rating from a respective one of the users via the network connection for a respective one of the objects and updates the ordinal ratings matrix stored in the non-volatile memory;

wherein the processor executes instructions to:
weight values in the ordinal ratings matrix with a weight matrix having the particular dimensional space;
hash the weight matrix into a lower dimensional space by one of row and column by multiplying a projection matrix by the weight matrix;
hash the ordinal ratings matrix into a lower dimensional space by one of row and column by:
multiplying the projection matrix by an element-wise product of the weight matrix and ordinal ratings matrix to form a reduced ratings matrix; and
dividing, element-wise, the reduced ratings matrix by the hashed weight matrix;
low-rank approximate a result of the element-wise division and the hashed weight matrix by alternating least squares;
update a result of the low-rank approximation for the one of row and column using the ordinal ratings matrix and the weight matrix; and
generate a recommendation for one of the objects for a user based on the low-rank approximated hashed weighted ordinal ratings matrix.

13. The system of claim 12, wherein the projection matrix is a sparse projection matrix formed of a convex combination of a subset of users and wherein the projection matrix is selected through a projection matrix sampling procedure.

14. The system of claim 12, wherein the projection matrix sampling procedure is parameterized by a temperature parameter;
a value of the temperature parameter selected that results in a size of the subset of users that have an effect on users in a projected space of from 4 to 5 users.

15. The system of claim 12, wherein the system further includes a graphics controller coupled to the processor and coupled to a display device, and wherein the processor executes instructions to display a visual representation of the recommendation.

* * * * *

UNITED STATES PATENT AND TRADEMARK OFFICE
CERTIFICATE OF CORRECTION

PATENT NO. : 8,631,017 B2  
APPLICATION NO. : 12/970262  
DATED : January 14, 2014  
INVENTOR(S) : Martin B. Scholz et al.

It is certified that error appears in the above-identified patent and that said Letters Patent is hereby corrected as shown below:

On the title page, Item (73), Assignee, in column 1, line 1,
delete "Development," and insert -- Development Company, --, therefor.

Signed and Sealed this
Thirteenth Day of May, 2014

Michelle K. Lee
*Deputy Director of the United States Patent and Trademark Office*